B. R. WINGFIELD.
THRUST OR COLLAR BEARING.
APPLICATION FILED DEC. 18, 1918.
1,325,459.
Patented Dec. 16, 1919.
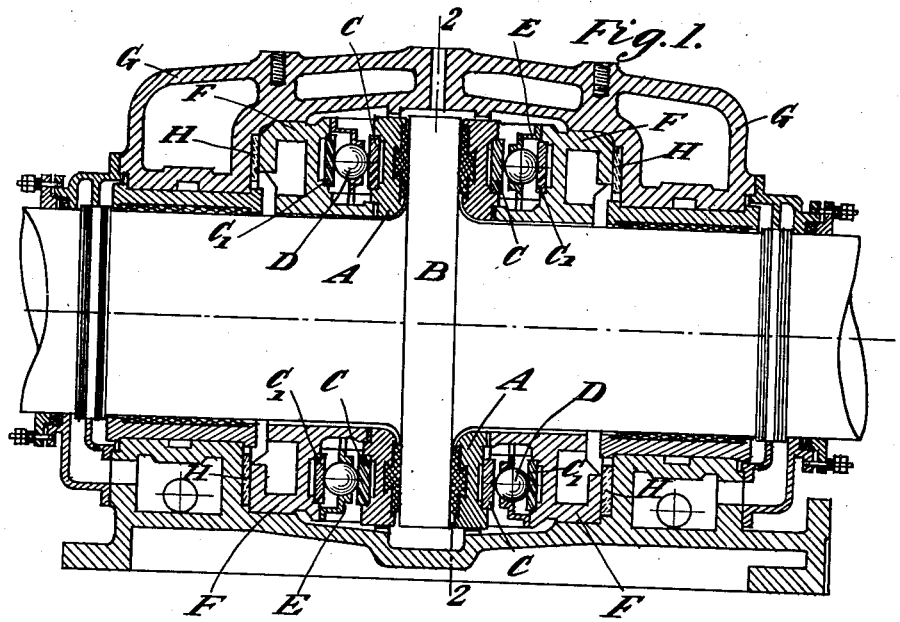
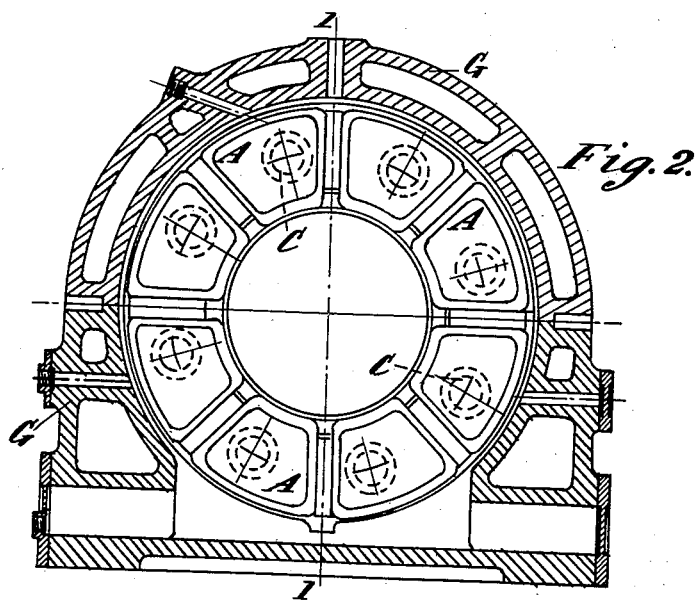
Inventor.
B. R. Wingfield.
by Wilkinson & Giusta
Attorneys.

UNITED STATES PATENT OFFICE.

BERNARD ROBERT WINGFIELD, OF WEST DRAYTON, ENGLAND.

THRUST OR COLLAR BEARING.

1,325,459.  Specification of Letters Patent.  Patented Dec. 16, 1919.

Application filed December 18, 1918. Serial No. 267,371.

*To all whom it may concern:*

Be it known that I, BERNARD ROBERT WINGFIELD, a subject of the King of Great Britain, residing in West Drayton, England, have invented certain new and useful Improvements in Thrust or Collar Bearings, of which the following is a specification.

The invention relates to thrust or collar bearings of the type described in British specification No. 875 of 1905 and has for its object to insure equal distribution of the load over the various pads or blocks and to simplify the manufacture.

In the accompanying drawing which shows an example of a construction according to the invention, Figure 1 is a section on the line 1—1 of Fig. 2 and Fig. 2 a section on the line 2—2 of Fig. 1.

The tilting blocks A rest with their white metal surfaces against the thrust collar B. On the back of the blocks A, circular spring disks C are inserted, the centers of the disks coinciding with the desired tilting points of the blocks. The spring disks C rest against steel balls D, the steel balls being held in position by cages E. The cages E are suitably secured, as for example by bolts, to fixed rings F through which the thrust is transmitted to the housing G. Where the balls rest against the rings F, spring disks $C_1$ are inserted, the centers of these disks being opposite the centers of the disks inserted in the blocks. In order to be able to adjust the position of the thrust collar loose rings H are inserted between the rings F and the housing G. The cages E, rings F and adjusting rings H are all made in halves. The blocks A are cast as a ring, the spring disks are inserted and are ground in position before the blocks are separated. In this way complete uniformity of distance between the thrust surfaces and the outside of the spring disks is obtained. The spring disks inserted in the rings F are also ground in position so that perfect uniformity of distance between them and the back surface of the ring is obtained. The balls D which form the swivel points are all of uniform diameter. In this way great uniformity of pressure over the various blocks is secured and the extremely small inequalities which may occur are equalized by the spring disks.

Having thus described the nature of the said invention and the best means I know of carrying the same into practical effect, I claim:—

1. A thrust or collar bearing of the pivoted block type comprising a plurality of metal blocks arranged in a ring around the shaft and abutting against the shaft collar, a fixed ring encircling the shaft and positioned opposite the ring of metal blocks, a plurality of pivot balls interposed between the said fixed ring and metal blocks, and means for maintaining said balls in definite positions with respect to the fixed ring, substantially as and for the purpose set forth.

2. In a thrust or collar bearing of the pivoted block type as claimed in claim 1, a plurality of spring disks arranged in a circle around the fixed ring and interposed between said ring and the pivot balls, substantially as and for the purpose set forth.

3. In a thrust or collar bearing of the pivoted block type as claimed in claim 1, a plurality of spring disks each mounted in one of the pivoted blocks and interposed between said block and a pivot ball, substantially as and for the purpose set forth.

4. A thrust or collar bearing of the pivoted block type, comprising on each side of the shaft collar a ring of pivoted blocks bearing against said collar, a fixed ring opposed to the ring of pivoted blocks, a ring of pivot balls equal in number to the pivoted blocks interposed between the said blocks and the fixed ring, and means for maintaining each of the said balls in position to act as a fulcrum for the block opposed to it, substantially as and for the purpose set forth.

5. In a thrust or collar bearing of the pivoted block type as claimed in claim 4, a spring disk interposed between each pivot ball and block, and a second spring disk interposed between each pivot ball and the fixed ring, substantially as and for the purpose set forth.

In testimony whereof I have signed my name to this specification.

BERNARD ROBERT WINGFIELD.